March 8, 1960 W. R. ABBOTT 2,928,033

DIGITAL COMPARATOR

Filed Oct. 23, 1957 2 Sheets-Sheet 1

INVENTOR.
WILTON R. ABBOTT
BY
Allan Rothenberg
ATTORNEY

March 8, 1960 W. R. ABBOTT 2,928,033
DIGITAL COMPARATOR
Filed Oct. 23, 1957 2 Sheets-Sheet 2
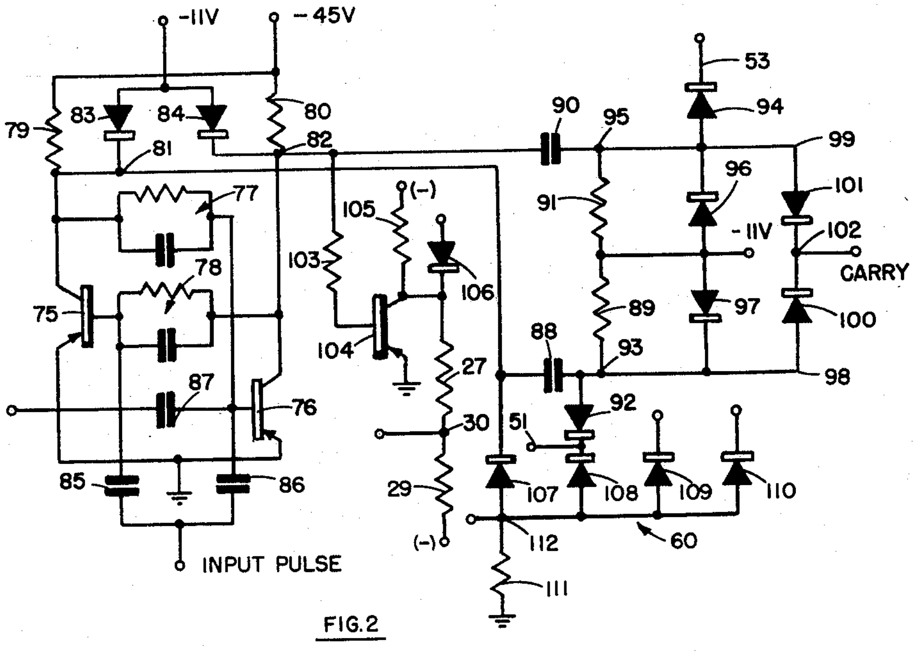
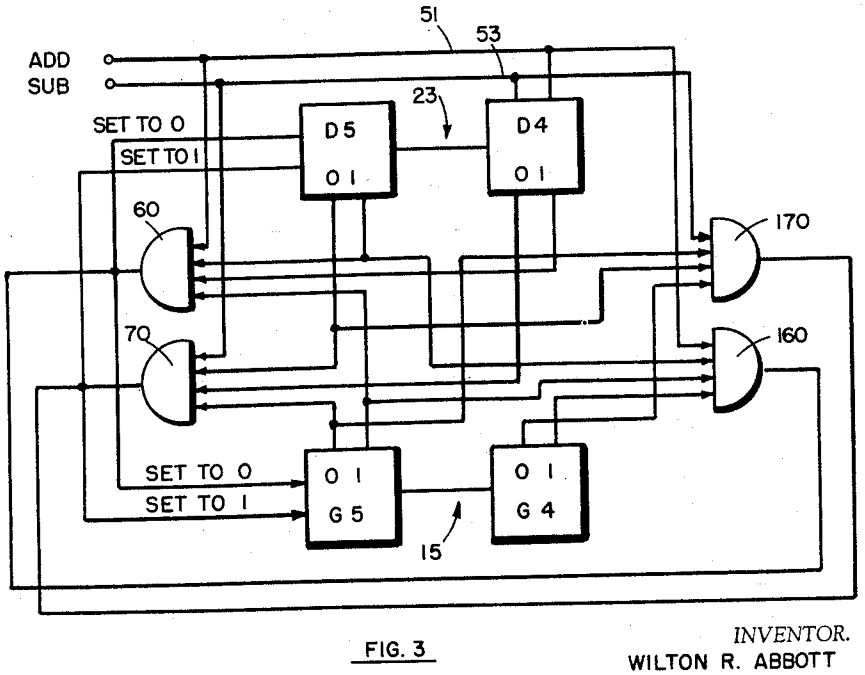
FIG. 3
INVENTOR.
WILTON R. ABBOTT
BY
Allan Rothenberg
ATTORNEY United States Patent Office 2,928,033

Patented Mar. 8, 1960

2,928,033

DIGITAL COMPARATOR

Wilton R. Abbott, Palo Alto, Calif., assignor to North American Aviation, Inc.

Application October 23, 1957, Serial No. 691,854

17 Claims. (Cl. 318—28)

Figure 1:
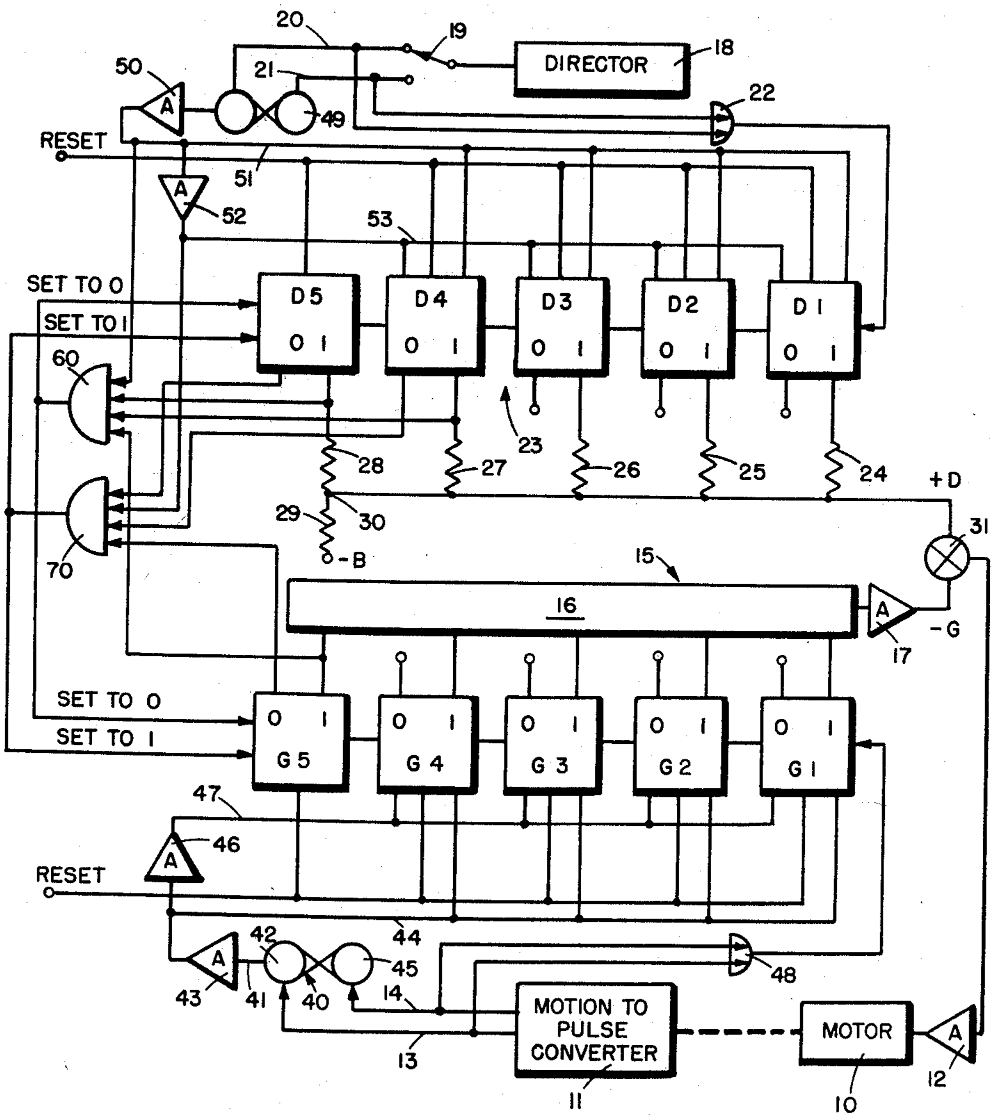

This invention relates to digital comparators and particularly concerns a digital comparator utilizing storage devices of relatively limited capacity for comparing numbers of relatively large magnitude.

When utilized in a servo system, a digital comparator is called upon to produce a signal indicative of the error between a command and actual position which are expressed in digital form. Thus, the comparator or error counter will receive a pulse commanding an increment of motion and a pulse indicating the response to such command. A system of this type is disclosed in the patent to Seid et al., for Digital Servo, No. 2,537,427, issued January 9, 1951. In a system such as disclosed in this patent, both command and response or gage pulses are fed to a single error counter through a buffer or synchronizer. The synchronizer stores the pulses for a short time and then releases them into the error counter in such a way that the counter never needs to accept two pulses simultaneously. This method requires synchronization by means of relatively complex circuitry and furthermore is frequency limited by the clock therein.

The present invention provides an error counter or digital comparator which needs no synchronizer at the input thereof. In accordance with the invention a pair of storage devices or counters is provided, one to store and count command pulses and the other to store and count response or gage pulses. Both counters take proper account of sign. A digital to analog conversion is effected for each counter and an analog difference is obtained as the servo error signal which provides the desired output. If counters of large capacity could be used with the required precision, this arrangement would work well with no modifications. However, the nature of conventional digital to analog conversion networks places stringent limitations upon the capacity of a counter due to the excessive precision required of the resistors of the conventional digital to analog converter. For example, referring to Fig. 7 of the patent to Seid et al., a slight drift in the value of resistances 75 or 76 due to temperature changes or other causes would contribute as much change in the output of summing networks 16 or 17 as would the counting of several additional pulses by the first stage of the counter. When very large numbers are stored in the counter it can be seen that the accuracy of the counter in terms of digits may suffer due to drift in the values of these summing resistances. Thus, it will be apparent that for increased precision it is desirable to limit the number of stages of a counter utilizing a resistance digital to analog conversion network. With such a limited number of stages, however, large errors in operation can occur if one counter overflows. It would be exceedingly rare to have both counters overflow simultaneously in a servo system.

The present invention obtains exceedingly great precision by utilizing counters of limited capacity together with a conventional digital to analog conversion network and at the same time prevents overflow of one or both of the counters. Fundamentally, the concept of this invention is to anticipate overflow and when such overflow is approached, to change the number stored in both of the counters by an equal amount. Since the output of the comparator is the difference between the two input numbers, command and gage number, it will be seen that adding or subtracting an equal number from both counters will not affect the output difference. Thus, according to the present invention, when overflow is anticipated, the state of the most significant stage of each counter is changed. Since the counts in the two counters are different, it will be seen that the like change effected in both upon approach of overflow must not be greater than the lesser of the two numbers when the change is effected by subtraction. Alternatively, when the change is effected by addition, the change is preferably not less than the greater of the two numbers although it is limited only by the difference between counter capacity and the greater number. Therefore, the circuitry for changing the counters upon approach of overflow will in effect sense the numbers stored in both counters.

It is an object of this invention to provide an improved digital comparator.

It is a further object of this invention to provide a digital comparator embodying storage devices for storing relatively small numbers and which comparator can compare relatively large numbers.

Another object of this invention is to prevent overflow of the counters of a digital comparator.

Still another object of this invention is to provide an improved digital servo system.

A further object of the invention is to avoid the need for synchronization of the inputs to a digital comparator.

These and other objects of the invention will become apparent from the following description taken in connection with the accompanying drawings, in which Fig. 1 is a block diagram of a digital servo incorporating the comparator of this invention;

Fig. 2 represents the circuitry of an exemplary stage of one of the storage devices together with one of the And gates of Fig. 1, and Fig. 3 illustrates portions of a modification of the comparator of Fig. 1.

Referring now to Fig. 1, the digital servo illustrated may be substantially similar to the servo shown in Fig. 2 of the above mentioned patent to Seid et al. but has substituted for the comparison network interposed between pulse generator 11 and power amplifier 22 of the patent, the novel digital comparator of this invention. An electric to mechanical converter 10 which may be an electric valve actuated hydraulic motor or an electric motor, provides the desired mechanical output such as rotation of a motor shaft or linear motion of a worktable. A mechanical motion to electric signal converter such as gage 11 is associated with the driven element or the output of motor 10 to provide a number of electric pulses indicative of the output mechanical motion. Motor 10 and converter or gage 11 may be similar to the motor 5, slotted disk 6, photocells 9, 10 and pulse generator 11 of Fig. 2 of the patent to Seid et al. The motor is driven from amplifier 12 with a signal having a magnitude and sign in accordance with the magnitude and sign of the analog error output of the digital comparator or error counter. The output of converter 11 comprises either a train of pulses on line 13 for motion in one direction (adding) or a similar train of pulses on line 14 for motion in the other direction (subtracting). Each of these pulses represents a predetermined increment of mechanical output motion and is fed through Or gate 48 to the input of reversible binary gage counter 15 here shown as including five binary stages G1, G2, G3, G4 and G5 numbered in successively increasing binary order. The counter 15 counts the pulses supplied thereto and stores the number counted in digital form. Each stage stores the binary digit of one order of the counted number. Thus, for example, a digit stored in stage G1 represents decimal number 1, a digit stored in second order stage G2 represents decimal number 2, a digit stored in third order stage G3 represents decimal number 4 and the counter thus has a total capacity of decimal 31. It is to be understood that while five-stage counters are illustrated, the invention is equally applicable to counters of more or fewer stages. The number digitally stored in counter 15 is converted to an analog signal in digital to analog converter 16 which feeds to inverting amplifier 17 the analog of the counter number. A train of command pulses each indicative of a desired increment of output motion is supplied from director 18 through a sign switch 19. The sign switch 19 may be actuated manually or otherwise in accordance with the direction of the desired motion. In the position shown, the director pulses are fed to add line 20 to increase the director number while in the other position of switch 19 the director pulses are fed to subtract line 21 to decrease the director number. The director pulses commanding motion in either direction are fed from lines 20 and 21 through Or gate 22 to a reversible binary director counter 23 comprising five binary stages D1, D2, D3, D4 and D5 each of a binary order corresponding to the stage of like order of the gage counter 15. Thus, the director counter will digitally store the director number supplied thereto. The digital storage of counter 23 is converted to an analog signal by means of a conventional digital to analog conversion network which may be identical to digital to analog converter 16. This conversion network for counter 23 comprises a plurality of weighted resistors 24, 25, 26, 27 and 28 of successively decreasing value in accordance with the value of the order of the counter stage individual thereto. One end of each of the weighted resistors 24 through 28 is connected in common to one end of the summing resistor 29 which has the other end thereof connected to a suitable source of bias potential. The currents through weighted resistors 24 through 28 are summed in resistor 29 to provide a signal at output terminal 30 which is fed to an algebraic summing network 31. The output analog signal of digital to analog converter 16 is fed through amplifier 17 which reverses the sign thereof to the summing network 31 which thus provides as its output the desired analog error signal having a magnitude in accordance with the difference between the numbers stored in counters 23 and 15 and a sign in accordance with the greater of the two numbers. This error signal after suitable amplification in amplifier 12 thus drives motor 10 in the desired direction in accordance with the magnitude of the error output of the comparator which comprises the counters 15 and 23.

Each of the counters is substantially similar to the counter shown in Fig. 7 of the Seid et al. patent but has a conversion network for one sign only. Counter 15 will add or subtract the pulse supplied to stage G1 depending on whether there is an add signal on line 13 or a subtract signal on line 14. For example, when adding, the reversible counter will not provide a carry pulse to change a state of a next higher order stage upon a shift from binary zero to binary one whereas a carry pulse will be provided upon a shift from binary one to binary zero. Similarly, when subtracting, a carry pulse is provided upon a shift from zero to one while no carry pulse is provided on a shift from one to zero. When adding, a positive pulse from line 13 is fed to flip flop or bistable multivibrator 40 to provide a negative signal at the output 41 of the left hand element 42 of the flip flop. The negative signal on line 41 is inverted in amplifier 43 to provide a positive add signal on add line 44 which is fed to each of stages G1 through G4. When subtracting, a positive pulse on subtract line 14 is fed to element 45 of flip flop 40 to provide a positive signal on line 41 and a negative signal at the output of amplifier 43 which is inverted in amplifier 46 to provide a positive signal on subtract line 47 to be fed to counter stages G1 through G4. Thus, depending upon whether the pulse from gage 11 appears on line 13 or line 14, the gage counter 15 will be set to either add or subtract. Pulses from either line 13 or 14 are fed through Or gate 48 which thus applies a counting pulse to the counter 15 whether adding or subtracting. Similarly a counting pulse is fed to counter 23 from Or gate 22 whether the counter is adding or subtracting. The add and the subtract lines 20 and 21 are fed through flip flop 49 and amplifier 50 to add line 51 and further through amplifier 52 to subtract line 53 in the same manner indicated in connection with the reversible counter 15.

Up to this point there has been described a servo system embodying a digital comparator having counters which will overflow if the number of pulses applied thereto will exceed the counter capacity. In order to anticipate overflow when adding, there is provided a four-input And gate 60 which senses the state of the two highest order director stages D5 and D4. Assuming a zero count of a counter will place all of the stages therein in binary zero condition, if stages D4 and D5 are both in binary one condition the number stored in the counter must be at least 24. The counter is thus approaching its maximum capacity of 31 whereby the And gate 60 will feed a signal to the highest order stages D5 and G5 of both counters 23 and 15 to set each highest order stage to binary zero and thus subtract 16 units from the count of each. The subtraction of the same number from each counter, of course, will not affect the difference between the two stored numbers. Since this particular subtracting operation is desired solely when adding a third input to And gate 60 in addition to the two inputs from the binary 1 side of D4 and D5 will comprise the signal from add line 51. Since the function of the anticipation device or And gate 60 is to subtract a fixed number such as the 16 indicated from both of the counters, it is necessary that counter 15 at this time have a number stored therein at least equal to the 16 which is to be subtracted. For this reason a fourth input to the anticipation network from the one side of highest order stage G5 is required. Thus, upon coincidence of binary 1 in stages D4, D5 and G5 together with an add signal to counter 23, the highest order stages D5 and G5 will both be changed from 1 to 0 by the output of gate 60, and the counters may then continue to add additional input pulses thereto.

A similar anticipation network in the form of And gate 70 is provided when subtracting to change both stages D5 and G5 from 0 to 1. Thus, as the numbers stored in the counters are approaching zero, overflow of both will be prevented by adding 16 to both whereby the input pulses applied thereto may continue to diminish the counts of the counters without changing the error output thereof. The And gate 70 which operates only when subtracting has one input thereof supplied from subtract line 53 of director counter 23. Three additional inputs of And gate 70 are supplied from the binary zero side of stages D5, D4 and G5 whereby upon the occurrence of a zero in these stages when subtracting both highest order stages are set to binary one by the output of gate 70.

The operation of the overflow anticipating network will now be described in connection with a specific example. In a digital servo, the director count will normally lead the gage count. Assume that director pulses are being added, that the number in the director counter is greater than or equal to decimal 24 and that the number in the gage counter 15 is greater than or equal to decimal 16. Thus at least stages D5 and D4 and G5 will all be binary one and the most significant stage of each counter may be changed to zero to subtract 16 from each count without changing the difference. Under these circumstances, an input pulse to either counter will not affect the most significant stage so that the change thereof need not be separated in time from input pulses. This condition could apparently be violated by a subtract pulse to the gage counter when the count therein is 16, but it is noted that in such a case, the director count is 24 or more and thus the error drive is such as to produce add pulses.

Again, suppose that director pulses are being subtracted, the director again leading the gage count, the director count is equal to or less than 7 and the gage count equal to or less than 15. In this instance, gage stage G5 is binary zero and both director stages D4 and D5 are binary zero whereby 16 may be added to both counters by changing both stages D5 and G5 from zero to one.

It is noted that overflow might possibly occur if the error were such when adding, for example, that the director count reached its capacity at 31 before the gage count reached 16. This characteristic of the system places a limit on the extreme allowable errors of the servo system of plus or minus 15. It is to be noted, however, that this is likewise the extreme allowable error in a conventional 5-stage error counter of the type shown in the patent to Seid et al., for example. In such a counter the last stage must be utilized to store the sign of the error and thus such a five stage counter has an effective capacity of but four stages or 15 units.

Each of the counters 15 and 23 may be substantially similar to the reversible binary counter shown in Fig. 7 of the patent to Seid et al. with the elimination of the final stage for indicating sign of the stored number and the negative summing network thereof. Illustrated in Fig. 2 is the detailed circuitry of an exemplary stage such as stage D4 of a transistorized version of the counter 23 of Fig. 1. Obviously the circuit may also be mechanized with vacuum tubes. The counter stage comprises a conventional flip flop or bistable multivibrator including a pair of grounded emitter transistors 75, 76 having parallel resistance capacitance networks 77, 78 connecting the collector of each to the base of the other. The collectors may be coupled to a source of negative voltage such as, for example, negative 45 volts through resistors 79 and 80 respectively while the output of each transistor at points 81 and 82 of the respective collectors is clamped to a source of negative voltage such as, for example, negative 11 volts by means of diodes 83, 84 when the respective transistors are cut off. During conduction of either transistor the collector output terminal thereof is substantially at ground. The counting pulse or carry pulse from the next lower stage may be fed to both bases by input capacitors 85, 86 to effect a change of condition of the flip flop. A reset pulse (synchronously applied to each corresponding flip flop element) may be applied via capacitor 87 to the base of transistor 76 to place the flip flop and each stage of a counter of which it forms a part in the binary zero condition with transistor 76 conducting and transistor 75 cut off. The change of state of each transistor appearing at points 81 and 82 respectively is differentiated in differentiators comprising capacitor 88, resistor 89 and capacitor 90, resistor 91 respectively. The add signal from add line 51 is fed through diode 92 to point 93 which also comprises the two inputs to a coincidence or And gate which has an output indicating the direction of binary shift when adding. The subtract pulse from line 53 is fed through diode 94 to point 95 which comprises the two inputs to an And gate which indicates the sense of the change of state when subtracting. These And gates include diodes 96 and 97 respectively connected between a source of potential such as negative 11 volts and the respective gate outputs. The gate outputs are fed to the inputs 98, 99 of an Or gate comprising diodes 100, 101 and having an output at terminal 102 from which is derived the carry pulse which is fed to the counter stage of next higher order. The circuitry just described thus will produce a carry pulse at point 102 upon a change of flip flop state from binary one to binary zero when adding and upon a change of flip flop state from binary zero to binary one when subtracting. The carry pulse comprises the input to the next higher counter stage. The stage binary condition of binary one appears as a negative signal at point 82 from which it is fed through input resistor 103 to the base of grounded emitter transistor 104 which has its collector connected through resistor 105 to a suitable source of negative potential and clamped to a lesser source of negative potential through diode 106. It is the collector of the amplifying transistor 104 which is connected to the weighted resistor of the individual stage such as resistor 27 of Fig. 1. Thus, at point 30 the signal from each of the weighted resistors of the several counter stages is summed to provide the analog output of the number digitally stored in the counter stages. With the flip flop in binary one state, transistor 75 is conducting and point 81 is at ground or positive potential. This indication of binary one of the stage D4 is fed as one of the inputs to coincidence or And gate 60 which comprises diodes 107, 108, 109 and 110 having anodes thereof coupled in common to one end of resistor 111 which has the other end thereof grounded. The output of And gate 60 at terminal 112 is fed to each of stages G5 and D5 as previously described to set those stages to binary zero. For example, a positive pulse output from terminal 112 will be applied to the base of transistor 75 of stages G5 and D5 to cut off this transistor and place these stages in binary zero state. A second input to And gate 60 is derived from add line 51 at diode 108. The third and fourth inputs to the And gate are fed to diodes 109 and 110 as a binary one signal from stages D5 and G5.

The arrangement described heretofore is based upon the assumption that the number in one of the counters (the director counter) will lead the number stored in the other counter. This arrangement is entirely practical when the digital comparator is utilized in a digital servo system. However, for certain applications it may be desirable to compare a pair of numbers of a nature such that it is not known which of the numbers may lead the other or of a nature such that either may lead the other. For such a situation, the disclosed digital comparator may be simply modified as indicated in Fig. 3. Shown in Fig. 3 is only that portion of the digital comparator which is necessary to show the connections to the overflow prevention circuitry. Thus, stages D4, D5, G4, G5, gates 60, 70 and add and subtract lines 51, 53 may all be identical with the like numbered components of Fig. 1 and will be connected to the other components of the digital comparator as disclosed in Fig. 1. In order to provide overflow anticipation, should the gage counter 15 be leading, there is simply provided in addition to the previously described anticipating networks, 60 and 70, a pair of additional anticipating networks 160 and 170. The And gate of anticipating network 160 is substantially similar in function to And gate 60 and will provide a signal to set to binary zero both highest order stages D5 and G5 when adding. Since this And gate 160 is to operate with the count in counter 15 leading that of counter 23, two inputs of gate 160 are derived from binary one indication of G4 and G5 while a third input is derived from the binary one indication of D5. As before, the fourth input is derived from the add line. Thus, if counter 15 should store a number equal to or greater than 24 when adding, and the number in counter 23 is 16 or more, 16 units will be subtracted from the number stored in each counter. There is also provided the And gate 170 similar to And gate 70 which, when subtracting, will provide a signal to set both highest order stages D5 and G5 to binary one. Two of the inputs to coincidence gate 170 are derived from the binary zero indication of stages G4 and G5 while a third input is derived from the zero indication of stage D5 of the other counter. Since And gate 170 is to operate only when subtracting, it is supplied with its fourth input from the subtract line. Thus, if counter 15 stores a number of 7 or less, when counter 23 stores 15 or less during subtraction an output from gate 170 is provided to set both highest order stages D5 and G5 to binary one thereby adding 16 to both counters.

It will be seen that the described digital comparator utilizes a pair of counters or storage device of limited capacity and thus of high precision which are capable of handling numbers of any size without changing the difference between such numbers as indicated by the output of the comparator. The comparator is limited solely to an extreme allowable error of approximately half of its capacity and thus the extreme allowable error or difference between the two input numbers may be doubled or even further increased by adding one or more stages to the counters. The use of limited capacity counters is made possible by the overflow anticipating circuits which maintain each of the counters at counts not greater than the maximum counter capacity while at the same time maintaining the count difference equal to the difference between the numbers to be compared regardless of the magnitude of such numbers.

Although the invention has been described and illustrated in detail, it is to be clearly understood that the same is by way of illustration and example only and is not to be taken by way of limitation, the spirit and scope of this invention being limited only by the terms of the appended claims.

I claim:

1. A digital comparator comprising a pair of number storing devices, means connected with said devices for deriving a signal representing the difference between the numbers stored in said devices, and means responsive to at least one of said devices for changing the number in both said devices by an equal amount.

2. A digital comparator comprising first and second storage devices for respectively storing first and second numbers, means connected with said devices for deriving the difference between said stored numbers, means for anticipating overflow of one of said devices, and means responsive to said anticipating means for effecting a change of equal magnitude in both said stored numbers.

3. A digital comparator comprising a pair of storage devices for storing the digits of a pair of numbers, means for preventing overflow of said devices by effecting a like change in corresponding digits in each of said storage devices.

4. A digital comparator comprising a pair of storage devices for storing the digits of a pair of numbers to be compared, output means coupled with said devices, means for anticipating storage of a predetermined number in one of said devices and means responsive to said anticipating means for effecting a like change in each of the digits of a pair of stored digits of like digital order.

5. A digital counter comprising a storage device having a predetermined capacity for storing the digits of a variable number, output means coupled with said device, means for sensing a predetermined relation between said capacity and the number stored in said device, and means responsive to said sensing means for effecting a change in said stored number.

6. A digital comparator comprising a first storage device having a plurality of stages for respectively storing the digits of each order of a first number, a second storage device having stages corresponding to said first named stages for respectively storing the digits of each order of a second number, means connected with said devices for deriving the difference between said first and second numbers, and means responsive to at least one of said stages for controlling a stage of predetermined order in both said devices.

7. A digital servo comprising a first storage device having a plurality of stages for respectively storing the digits of each order of a first number, a second storage device having stages corresponding to said first named stages for respectively storing the digits of each order of a second number, means connected with said devices for deriving the difference between said first and second numbers, means responsive to at least one of said stages for effecting a like change in a stage of predetermined order in both said devices, and means for changing the number stored in one of said devices in accordance with said difference between said numbers.

8. A digital to analog error system comprising first and second counters for respectively counting the pulses of each of a pair of pulse trains individually applied thereto, means coupled with said counters for deriving an analog signal in accordance with the difference between the counts of said counters, means for anticipating overflow of at least one of said counters, and means responsive to said anticipating means for changing the count of both said counters.

9. A digital to analog error system comprising first and second counters for respectively counting pulses individually applied thereto, means coupled with said counters for deriving an analog signal in accordance with the difference between the counts of said counters, and means for changing the count of said counters to prevent overflow of said counters.

10. A digital comparator comprising first and second storage devices for respectively storing first and second numbers, means coupled with said devices for deriving the differences between said stored numbers and means responsive to said storage devices for selectively changing the number stored in both devices by an amount alternatively not greater than the lesser of the two stored numbers or not less than the greater of the two stored numbers.

11. A digital comparator comprising first and second reversible counting devices for respectively storing first and second numbers, means coupled with said devices for deriving the difference between said stored numbers and means responsive to said storage devices and selectively responsive to the counting direction for changing the number stored in both devices by an amount alternatively not greater than the lesser of the two stored numbers or not less than the greater of the two stored numbers.

12. A digital comparator comprising a pair of digital storage devices for respectively storing the instantaneous value of each of a pair of variable numbers, means coupled with said devices for deriving the difference between said numbers, and means responsive to the number stored in at least one of said devices for preventing overflow of said devices.

13. A digital comparator comprising a pair of digital storage devices for respectively storing the instantaneous value of each of a pair of variable numbers, means coupled with said devices for deriving the difference between said numbers, and means for preventing overflow of said devices, said last-named means including a logical circuit responsive to both magnitude and sense of variation of at least one of said stored numbers for effecting an equal change in both of said stored numbers.

14. A digital comparator comprising a pair of digital counters for respectively counting each of a pair of numbers, each said counter having a maximum capacity less than the maximum of the number to be counted thereby, means coupled with said counters for deriving the difference between the counts of said counters, and means for maintaining said counters at counts not greater than said maximum capacities while maintaining said count difference equal to the difference between said numbers.

15. A digital comparator comprising a pair of digital counters for respectively counting each of a pair of numbers, each said counter having a maximum capacity less than the maximum of the number to be counted thereby, means coupled with said counters for deriving the difference between the counts of said counters, means for maintaining said counters at counts not greater than said maximum capacities while maintaining said count difference equal to the difference between said numbers, said last mentioned means comprising means for sensing the approach of the count of at least one of said counters toward the capacity thereof, and means responsive to said sensing means for effecting a like change of the counts of both counters.

16. A digital servo system comprising an electrical signal to mechanical motion converter, a motion to pulse converter for generating a number of response pulses in accordance with the motion of said first named converter, a comparator for generating an error signal in accordance with the difference between said number of response pulses and a number of director pulses, and means for feeding said error signal to said first named converter, said comparator comprising a multi-stage response counter for digitally storing said response pulses, a multi-stage director counter for digitally storing said director pulses, means for deriving said error signal as a function of the difference between the numbers stored in said response and director counters respectively, a coincidence gate coupled to at least the highest order stage of each of said counters, and means responsive to said gate for changing the count of both said counters by an equal amount.

17. A digital comparator comprising a pair of reversible binary counters each having a plurality of stages for respectively storing the digits of each order of first and second numbers respectively, a pair of digital to analog conversion networks each respectively coupled to one counter, a summing network coupled with both said conversion networks, each said stage having a pair of output terminals indicative of the binary one and binary zero states of a respective stage, a first coincidence gate having two inputs thereof coupled with the binary one terminals of two highest order stages of one of said counters, a third input of said gate being coupled with the binary one terminal of the highest order stage of the other of said counters, means responsive to said gate for setting the highest order stage of both said counters to its zero state, a second coincidence gate having two inputs thereof coupled with the binary zero terminals of two highest order stages of said other counter, said second gate having a third input coupled with the zero terminal of the highest order stage of said one counter, and means responsive to said second gate for setting the highest order stage of both said counters to its binary one state.

References Cited in the file of this patent

UNITED STATES PATENTS 2,537,427 Seid et al. ---------------- Jan. 9, 1951
2,775,727 Kernahan et al. ---------- Dec. 25, 1956